(12) United States Patent
Kilcher et al.

(10) Patent No.: US 10,182,217 B2
(45) Date of Patent: *Jan. 15, 2019

(54) PROJECTION DEVICE AND A METHOD OF MANUFACTURING A PROJECTION DEVICE

(71) Applicant: INTEL CORPORATION, Santa Clara, CA (US)

(72) Inventors: Lucio Kilcher, Montreux (CH); Nicolas Abele, Lausanne (CH)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,183

(22) Filed: Dec. 19, 2016

(65) Prior Publication Data

US 2017/0230627 A1    Aug. 10, 2017

Related U.S. Application Data

(63) Continuation of application No. 14/417,018, filed as application No. PCT/EP2012/065318 on Aug. 6, 2012, now Pat. No. 9,523,905.

(51) Int. Cl.
*G03B 21/28* (2006.01)
*H04N 9/31* (2006.01)
(Continued)

(52) U.S. Cl.
CPC ......... *H04N 9/3135* (2013.01); *G02B 26/101* (2013.01); *G02B 27/0101* (2013.01);
(Continued)

(58) Field of Classification Search
CPC .... G03B 21/00; G03B 21/28; G03B 21/2033; H04N 9/3129; H04N 9/3164; H04N 9/3197; G02B 26/101
See application file for complete search history.

(56) References Cited

U.S. PATENT DOCUMENTS

2005/0140929 A1* 6/2005 Nambudiri ............. G02B 27/01
                                                    353/31
2009/0190099 A1* 7/2009 Takahashi ............. G02B 27/104
                                                    353/33
(Continued)

OTHER PUBLICATIONS

Office Action and Search Report received for Taiwanese Patent Application No. 102128057, dated Nov. 29, 2016, 12 pages including 6 pages English translation.

*Primary Examiner* — Sultan Chowdhury

(57) ABSTRACT

The present disclosure provides a projection device and manufacturing method, comprising the steps of fixing the positions of a red light source, green light source and blue light source so that the light sources are immovable; providing a mirror which is configured to oscillate such that it can scan light it receives across a display screen; positioning an optical component, which is configured to deflect light, such that it can receive red, green and blue light beams outputted from the red, green and blue light sources respectively; adjusting the optical component such that the optical component compensates for variation between the light sources, in the direction in which the red, green and blue light beams are output from the red, green and blue light sources, so that each of the red, green and blue light beams are directed to the same point on the display screen.

25 Claims, 9 Drawing Sheets

(51) Int. Cl.
*G02B 26/10* (2006.01)
*G03B 21/14* (2006.01)
*G02B 27/01* (2006.01)

(52) U.S. Cl.
CPC ....... *G02B 27/0149* (2013.01); *G03B 21/142* (2013.01); *G03B 21/28* (2013.01); *H04N 9/317* (2013.01); *H04N 9/3129* (2013.01); *H04N 9/3164* (2013.01); *H04N 9/3194* (2013.01); *G02B 2027/0112* (2013.01); *G02B 2027/0154* (2013.01); *Y10T 29/49826* (2015.01)

(56) References Cited

U.S. PATENT DOCUMENTS

| | | | |
|---|---|---|---|
| 2011/0096383 A1 | 4/2011 | Nomoto et al. | |
| 2012/0032875 A1* | 2/2012 | Sprowl | G02B 27/01 345/156 |
| 2012/0250306 A1* | 10/2012 | Sugiyama | B60K 35/00 362/231 |
| 2014/0293236 A1* | 10/2014 | Nagashima | H04N 9/3129 353/31 |

* cited by examiner

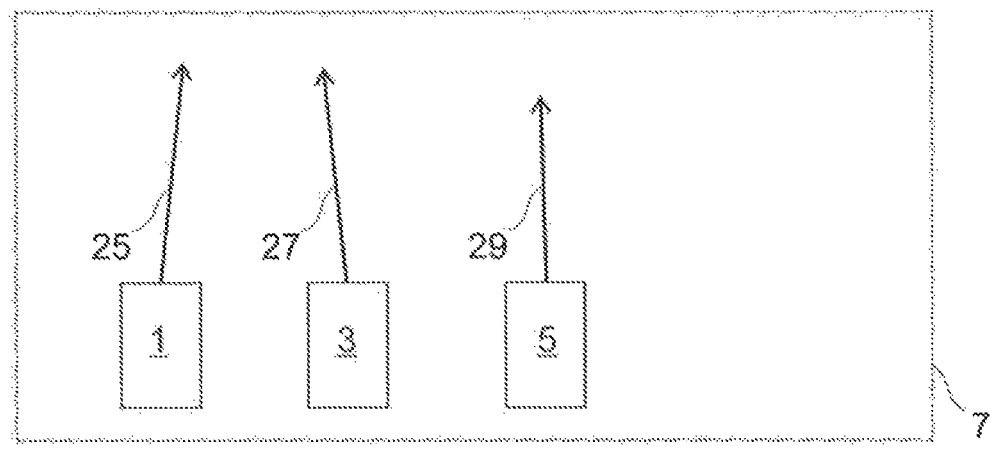
Fig. 1a
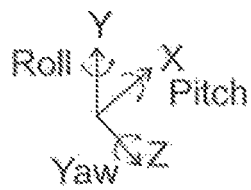
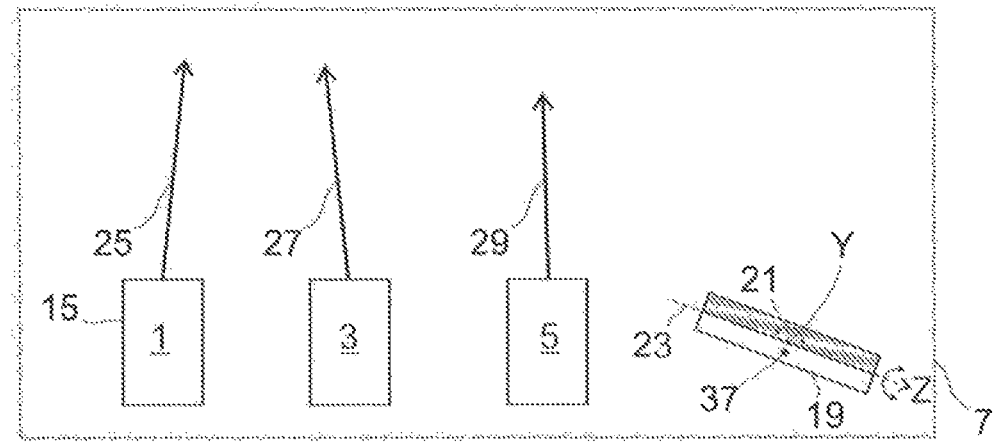
Fig. 1b

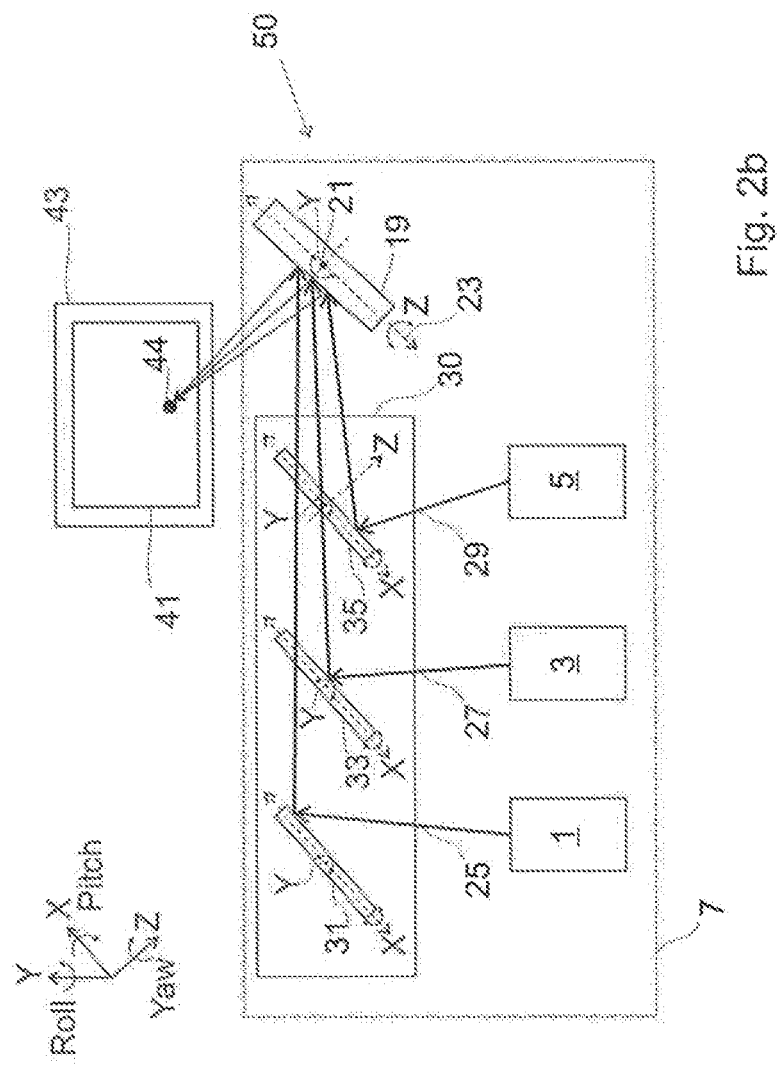

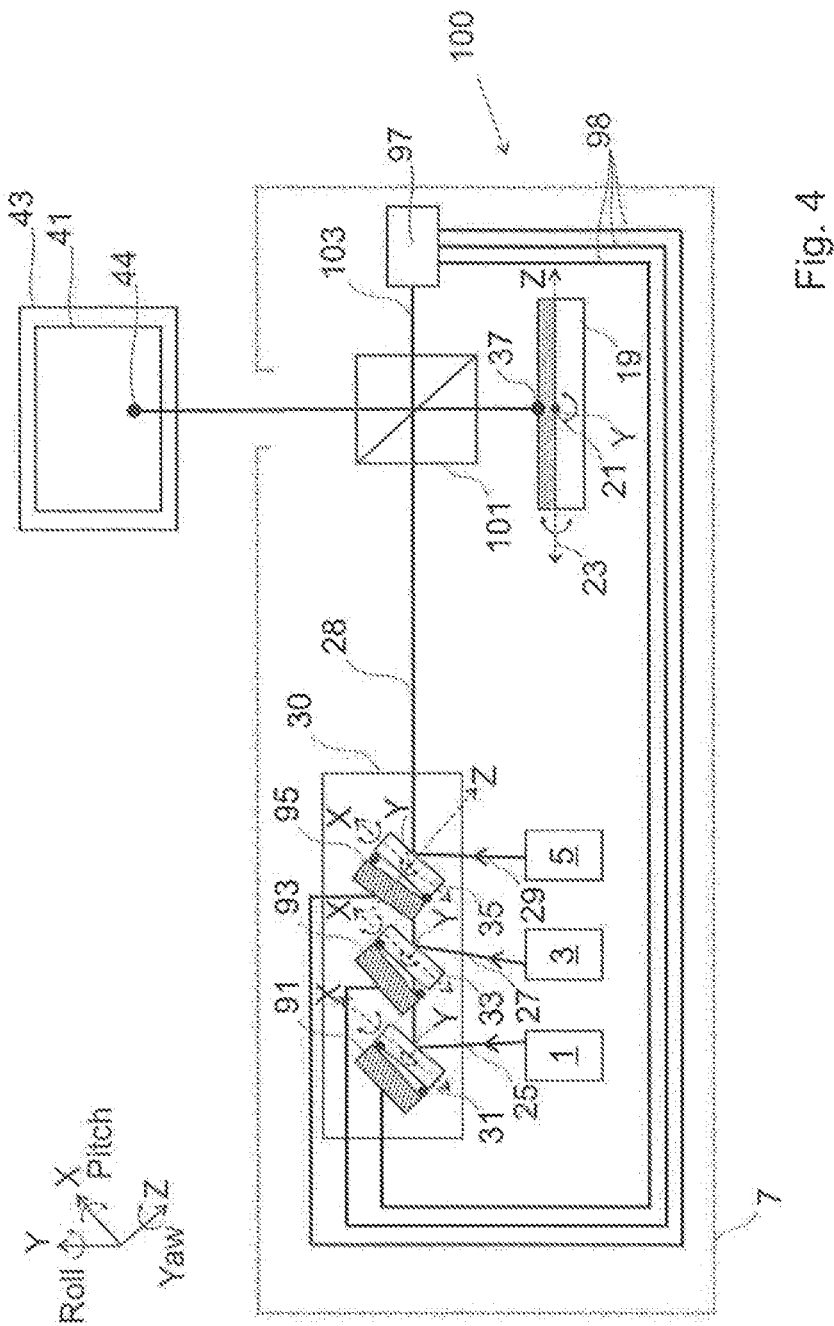

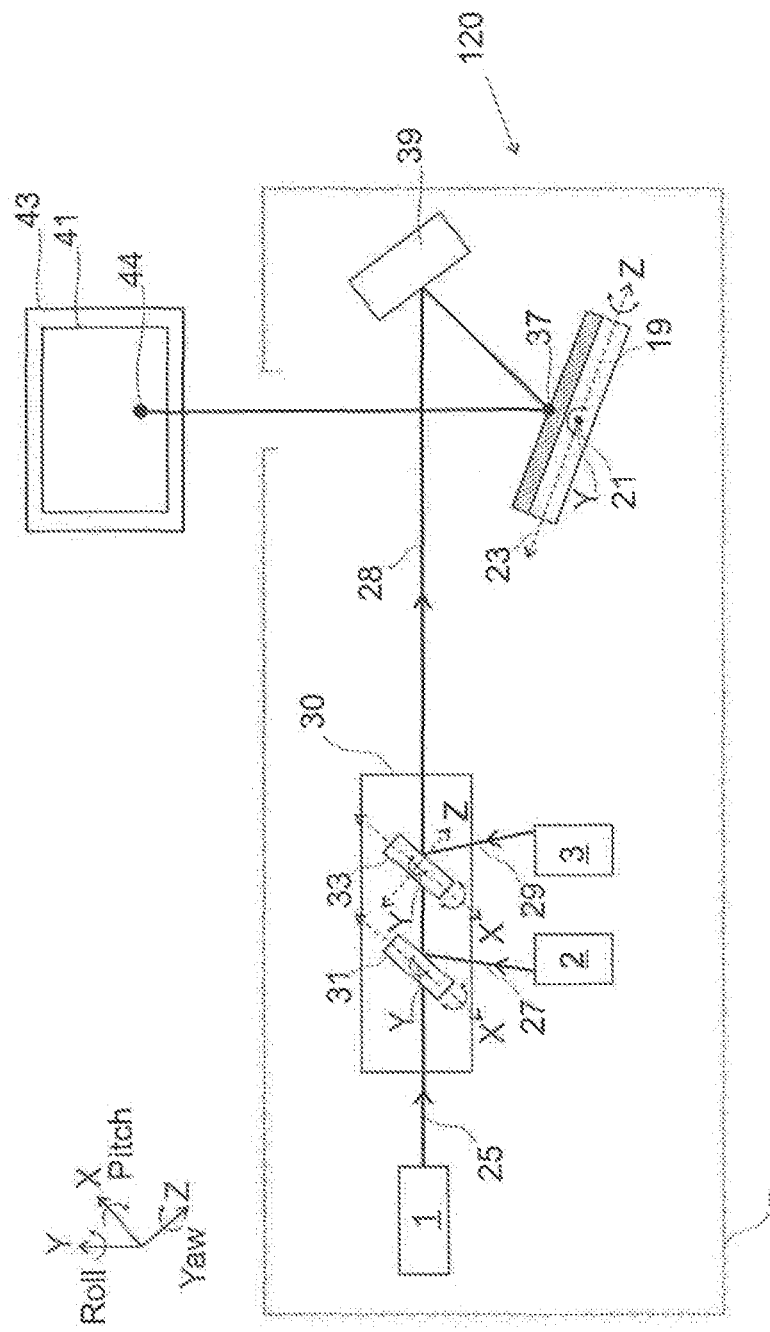

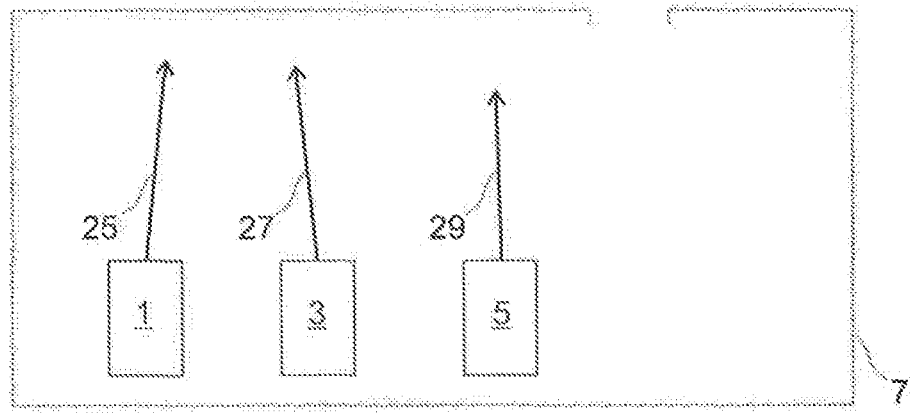
Fig. 6a
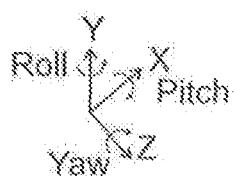
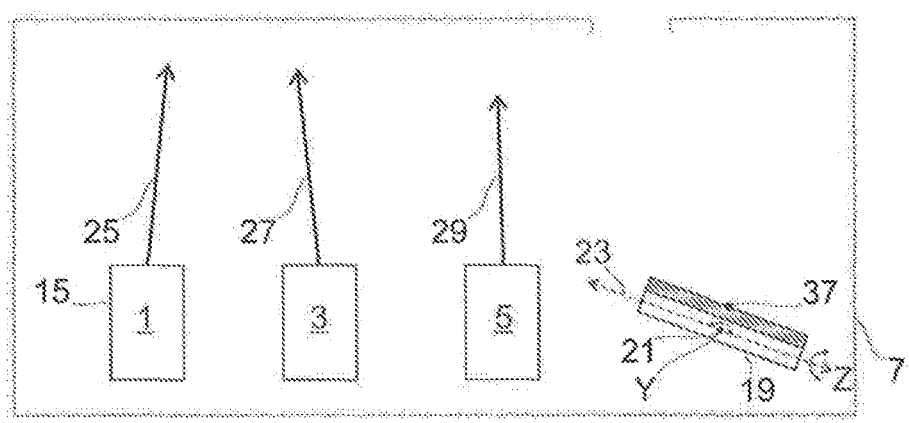
Fig. 6b

PROJECTION DEVICE AND A METHOD OF MANUFACTURING A PROJECTION DEVICE

CROSS-REFERENCE TO RELATED APPLICATIONS

This application is a continuation of, claims the benefit of and priority to, previously filed U.S. patent application Ser. No. 14/417,018 filed on Jan. 23, 2015, which is a U.S. national phase of PCT/EP2012/065318 filed on Aug. 6, 2012. The subject matter of which is hereby incorporated by reference in its entirety.

FIELD OF THE INVENTION

The present invention concerns a projection device and a method of manufacturing a projection device in which an optical component is used to compensate for variations in the direction in which light sources within the projection device emit their light beams (red, green and blue light beams which define pixels of a projected image) so that the light beams are directed to the same point on the display screen to allow light spots of the red, green and blue light beams to be aligned one on top of each other, so that a projected image with improved definition can be projected.

DESCRIPTION OF RELATED ART

Projection devices typically comprise a red, green and blue light sources which emit red, green and blue light beams respectively. The red, green and blue light sources are typically secured within the projection device using glue e.g. thermally activated or UV glue. The red, green and blue light beams are used to define pixels of an image which is to be projected. The red, green and blue light beams are typically combined to form a single beam. The single light beam defines a series of pixels. Light output from each of the red green and blue light sources is modulated so that the amount of each color in the single beam changes depending on the color of the pixel which is to be projected. The single beam is scanned across a display screen using one or two oscillating mirrors, so that the series of pixels defined in the single light beam are displayed, consecutively on the display screen. The single light beam is scanned across the display screen so quickly, that a complete projected image is visible to a viewer on the display screen.

It is important that each of the red, green and blue light beams are directed to the same point on the oscillating mirror, otherwise the light beams will not be deflected by the oscillating mirror to the same position on the display screen. If the light beams are not deflected to the same position on the display screen so the spots of each light beam will become misaligned and no longer overlay each other, resulting in a distorted or blurry projected image.

Due to variations in the mechanical placement of the light sources inside its packaging, typically a TO-CAN package, if the light sources are arranged in parallel they will each output their light beams in different directions. The variations in mechanical placement of the light sources may occur due to variations in acceptable positioning tolerances during the manufacturing or assembling stages. Indeed, in order to manufacture light emitting sources at high volumes and lower the cost of assembly and, more specifically, the light emitting source crystal fixation to its header is performed in a fast manner which lead to large uncertainty on the exact light emitting location, which is typically in the rage of +/−100 μm where few microns tolerance would be required for the MEMS scanning laser projection system application. The uncertainty of the light emitting surface location lead to uncertainty of the light beam emitting angular direction. Variations in the direction in which light sources emit their light beam also occur due to lateral displacement of the light source from the central axis of the package. During manufacture of projection devices, the variations in the directions (angular direction) in which the red, green and blue light beams are outputted from the light sources must be compensated for if each of the light beams are to be directed to the same point on the oscillating mirror and ultimately the same point on the display screen. To compensate the position and orientation each light source is independently orientated and positioned, to ensure that the light beams output from each of the light sources is directed to the same point on the oscillating mirror and on the display screen.

The adjustment of the position and orientation of the light sources means that glue which is used to secure the light source within the projection device will be unevenly distributed around the light source. For example, if the light source is located in a cylindrical socket of the projection device, and it is moved towards the 3' o'clock position so that its outputted light beam is directed to the same point on the oscillating mirror as the other two light beams, then light source will displace the glue which is located at the 3' o'clock position; accordingly, there will be much less glue at the 3' o'clock position compared to the glue at the 9' o'clock position. When the light source is in use it will increase in temperature; due to the increased temperature of the light source, the glue will change mechanical properties (i.e. soften) and the stress distribution around the light source will not be uniformly distributed, allowing the light source to become displaced from its original position. Once the light source becomes displaced from its original position, the light beam from that light source will no longer be directed to the same point on the oscillating mirror and/or on the display screen as the other two light beams resulting in a distorted projected image.

Some projection devices may comprise a beam combiner which is arranged to receive the light beams outputted form the light sources and to direct the red green and blue light beams to the same point on the oscillating mirror. However, during manufacturing the orientation and positioning of this beam combiner is fixed and the orientation and positioning of the light sources must still be adjusted to ensure that the light beams output from the light sources are in parallel as they arrive at the beam combiner so that the beam combiner can direct the red green and blue light beams to the same point on the oscillating mirror. Since position and orientation of the light sources must be adjusted the same problems as those discussed above tend to arise.

It an aim of the present invention to obviate or mitigate at least some of the disadvantages mentioned above.

BRIEF SUMMARY OF THE INVENTION

According to the invention, there is provided a method of manufacturing a projection device comprising the steps of, fixing the positions of a red light source, green light source and blue light source so that the light sources are immovable; providing a mirror which is configured to oscillate such that it can scan light it receives across a display screen; positioning an optical component, which is configured to deflect light, such that it can receive red, green and blue light beams outputted from the red, green and blue light sources respectively; adjusting the optical component such that the optical component compensates for variation between the light sources, in the direction in which the red, green and blue light beams are output from the red, green and blue light sources, so that each of the red, green and blue light beams can be, or, are, directed to the same, single, point on the display screen.

Since the red, green and blue light beams are direct to the same, single point on the display screen, the spots of each light beam will directly overlay one another on the display screen. Since the spots will directly overlay one another each pixel will have optimum definition. In the present invention the optical component is used to compensate for the variation in the directions (e.g. angular directions) in which the light beams are output from the light sources, so that light beams are directed to the same point on the display screen; this obviates the need for the position and orientation of the light sources to be adjusted during manufacturing to compensate for variations in the direction (e.g. angular direction) in which red, green and blue light beams are outputted from the red, green and blue light sources, respectively. Accordingly, glue which is used to fix the light sources can remain evenly distributed around each light source. An even distribution of glue will ensure that the light source is less susceptible to becoming displaced over time and temperature.

It will be understood that as the mirror oscillates about its oscillation axis to scan light, the light beams will be directed to consecutive points on the display screen.

Preferably the optical component is adjusted so that the red, green and blue light beams are directed to the same, single, point on the mirror. Preferably in this case, the optical component is configured to make each of the light beams parallel so that each light beam is parallel as it is incident on the mirror. Preferably the red, green and blue light beams are combined to form a single light beam.

Alternatively the red, green and blue light beams may be directed to different points on the mirror. In this case each of the red, green and blue light beams are output from the optical component at different direction depending on the point on the mirror to which the light beam is to be directed. Preferably the different points on the mirror which the light beams are directed are such that the mirror will be deflect the light beams to the same point on the display screen. The angle at which a light beam is incident on the mirror will determine the angle at which the light beam is reflected by the mirror; thus each light beam may be directed to an appropriate point on the mirror to achieve an angle of incidence with is require to ensure that that light beam is directed by the mirror to the same point on the display screen.

The step of fixing the positions of a red light source, green light source and blue light sources so that the light sources are immovable may comprise using glue to fix the position of each light source, wherein the glue is arranged such that it is evenly distributed around each light source when the light sources are fixed immovably in position.

The mirror may be configured to oscillate about two axes of oscillation which are orthogonal to one another. The method may comprise providing a pair of mirrors configured to oscillate such that they can scan light they receive across a display screen. Preferably a first mirror in the pair is configured to scan light along the horizontal normal and the second mirror in the pair is configured to scan light along the vertical normal. Each of the pair of mirrors may be configured to oscillate about an oscillation axis. Preferably the oscillation axis of the first mirror in the pair is orthogonal to the oscillation axis of the second mirror in the pair. The mirrors of a pair are preferably arranged in optical communication such that light can be reflected form a first mirror of the pair to a second mirror of the pair.

Preferably the red, green and blue lasers are fixed using a push fit fitting. The step of fixing the positions of a red light source, green light source and blue light sources so that the light sources are immovable comprises may comprise using push-fitting to fix the position of the light sources. Preferably each of the red light source, green light source and blue light sources comprise a connector which enables each of them to be connected to a push-fit fitting of the projection device. Preferably each comprise a connector which is configured to enables the red light source, green light source and blue light sources to be snap fitted into the push-fit fitting.

The step of fixing the positions of a red light source, green light source and blue light sources so that the light sources are immovable may comprise arranging the red light source, green light source and blue light source such that they are parallel and then fixing the positions of a red light source, green light source and blue light source so that the light sources are immovable from their parallel positions.

The method may further comprise combining the red light beam, green light beam and blue light beam, using the optical component, to form a single beam which is directed to the mirror. The mirror may be a deflection mirror.

The step of adjusting the optical component such that the optical component can direct each of the red, green and blue light beams to the same point on the on the display screen (and/or mirror), may comprise adjusting the orientation of at least one of a first, second and third reflector of the optical component, such that each reflector can deflect a respective light beam from a respective light source, to the same point on the display screen (and/or mirror).

Preferably the first reflector is a mirror, the second reflector is a dichroic mirror, and the third reflector is a dichroic mirror.

Preferably, the orientation of each of the first, second and third reflector is adjusted such that each reflector can reflect a respective light beam from a respective light source, to the same point on the display screen (and/or mirror).

The step of adjusting the orientation of a reflector may comprise changing the angular orientation only of the reflector. In this case the distance of the reflector with respect to the light sources remains unchanged.

The step of adjusting the optical component such that the optical component can direct each of the red, green and blue light beams to the same point on the display screen (and/or mirror), may comprise adjusting the positioning of at least one optical wedge of the optical component, relative to at least one of the light sources, such that the red, green and blue light beams are incident on the first, second and third reflectors respectively, at angles which ensure that red, green and blue light beams are deflected by the reflectors to the same point on the display screen (and/or mirror).

The step adjusting the optical component such that the optical component can direct each of the red, green and blue light beams to the same point on the display screen (and/or mirror), may comprise adjusting the positioning of each of three optical wedges of the optical component, relative to a respective light source such that the red, green and blue light beams are incident on the first, second and third reflectors respectively, at angles which ensure that red, green and blue light beams are deflected by the reflectors to the same point on the display screen (and/or mirror).

Preferably each of the red, green and blue light beams are incident on the first, second and third reflectors respectively at an angle of 45° to a surface of the respective reflector.

The method may further comprise fixing the position of a first reflector relative to the red light source, fixing the position of a second reflector relative to the green light source, and fixing the position of a third reflector relative to the blue light source. Preferably first, second and third reflectors are fixed such that they are in parallel. The first, second and third reflectors may be fixed such that they are immovable from their parallel arrangement.

Preferably the positioning of the at least one optical wedge relative to the light sources, may be adjusted such that red green and blue light beams incident on the first second and third reflectors respectively are in parallel.

The step of adjusting the positioning of an optical wedge may comprise moving the optical wedge laterally with respect to a light source and/or moving the optical wedge axially with respect to the light source. The angular orientation of the wedge may remain unchanged.

The step of adjusting the optical component such that the optical component can direct each of the red, green and blue light beams to the same point on the display screen (and/or mirror), may be carried out by one or more actuators. For example one or more actuators may be used to adjust the orientation of the first, second and third reflector of the optical component, such that each reflector can deflect a respective light beam from a respective light source, to the same point on the display screen (and/or mirror). Or, one or more actuators may be used to adjust the positioning of each of the three optical wedges of the optical component, relative to the light sources, such that the red, green and blue light beams are incident on the first, second and third reflectors respectively, at angles which ensure that red, green and blue light beams are deflected by the reflectors to the same point on the display screen (and/or mirror).

The method may comprise the step of operating the one or more actuators based on a correction signal generated by a sensor which is configured to sense if the red, green and blue light beams are being directed to the same point on the display screen (and/or mirror), so that the optical component is adjusted so that each of the red, green and blue light beams are directed to the same point on the mirror. Preferably the adjusting of the optical component by the one or more actuators based on a correction signal, is carried out dynamically i.e. when the projection device is in operation. The adjustment of the optical component by the one or more actuators based on a correction signal, may be carried out so as to compensate for alignment variations during operation.

The method may further comprise using a sensor to sense if the red, green and blue light beams being directed to the same point on the display screen (and/or mirror).

The sensor may be configured to detect in which direction each of the red, green and blue light beams output from the optical component, so as to determine if the light beams are being directed to the same point on the display screen (and/or mirror). The method may further comprise, generating a correction signal if the sensor determines that the red, green and blue light beams are not being directed by the optical component to the same point on the display screen (and/or mirror).

The method my further comprise using the correction signal to operate the actuator such that it adjusts the optical component such that the optical component directs each of the red, green and blue light beams to the same point on the display screen (and/or mirror).

The correction signal may be usable by an actuator which is operable to adjust the optical component, to adjust the optical component so that the red, green and blue light beams are being directed by the optical component to the same point on the display screen (and/or mirror). For example, the method may comprise the step of sending the correction signal to an actuator, operating the actuator to adjust the orientation of at least one of a first, second and/or third reflector such that each reflector can deflect a respective light beam from a respective light source, to the same point on the display screen (and/or mirror). Alternatively, the correction signal may be sent to an actuator, and the actuator may be operated to adjust the positioning of an optical wedge such that the red, green and blue light beams are directed to the same point on the display screen (and/or mirror).

Preferably the sensor is used to sense if the red, green and blue light beams being directed to the same point on the display screen (and/or mirror), while the projection device is in operation.

According to a further aspect of the present invention there is provided a projection device comprising, a red light source, green light source and blue light source, operable to output a red, green and blue light beams respectively, wherein each light source is arranged in an immovable fixed position, a mirror which is configured such that it can oscillate to scan light, which it receives, across a display screen an optical component which is configured to direct, red, green and blue light beams output from the red, green and blue light sources respectively, to the mirror, wherein the optical component is configured to compensate for variation between the light sources, in the directions in which the red, green and blue light beams are output from the red, green and blue light sources respectively, so that each of the red, green and blue light beams are directed to the same point on the display screen.

Preferably the optical component is configured to compensate for variation between the light sources, in the directions in which the red, green and blue light beams are output from the red, green and blue light sources respectively, so that each of the red, green and blue light beams are directed to the same point on the mirror. The light beams are preferably directed by the mirror to the same point on the display screen.

The projection device may further comprise glue which fixes the light sources in their immovable fixed position. Preferably the glue is configured to be evenly distributed around each light source. The glue is provided as a layer which has an even thickness throughout.

Preferably the light sources are in parallel when in their immovable fixed position.

The optical component may comprise at least one reflector, wherein the optical component is further configured such that the orientation of the at least one reflector can be adjusted. Preferably the optical component comprises at least a first and second reflector, wherein the optical component is further configured such that the orientation of each reflector can be adjusted independently of the other reflector. The optical component may further comprise a third reflector and the orientation of the third reflector can be adjusted independently of the first and second reflectors. Preferably the optical component comprises a first, second and third reflector, wherein the optical component is further configured such that the orientation of each reflector can be adjusted independently of the other reflectors.

Each of the red, green and blue light beams might require a different amount of deflection in order to be directed to the same point on the display screen (and/or mirror), since each of the red green and blue light beams are outputted in different directions (e.g. angular directions) from their respective fixed light sources. Providing reflectors which can be independently adjusted enables the device to be adjusted such that each light beam can be directed to the same point on the display screen (and/or mirror).

The optical component is preferably configured to combine the red, green and blue light beams to form a single beam.

The optical component may comprise a first, second and third reflector, wherein each of the first, second and third reflectors are arranged in parallel and fixed relative to one another, and wherein the optical component further comprises a first, second and third optical wedge each of which is interposed between a respective light source and reflector, wherein the optical component is further configured such that the positioning of each optical wedge can be adjusted independently of the other optical wedges.

Preferably a first optical wedge is interposed between the red light source and first reflector such that a red light beam output from the red light source passes through the first optical wedge before it is incident on the first reflector, and a second optical wedge is interposed between the green light source and second reflector such that a green light beam output from the green light source passes through the second optical wedge before it is incident on the second reflector, and a third optical wedge is interposed between the blue light source and third reflector such that a blue light beam output from the blue light source passes through the third optical wedge before it is incident on the third reflector.

The optical component may comprise at least a first and second reflector, wherein each of the first and second reflectors are arranged in parallel and fixed relative to one another, wherein the optical component may further comprise at least a first and second and third optical wedge each of which is interposed between a respective light source and a reflector, wherein the optical component is further configured such that the positioning of each optical wedge can be adjusted independently of the other optical wedges.

Preferably a first optical wedge is interposed between the red light source and first reflector such that a red light beam output from the red light source passes through the first optical wedge before it is incident on the first reflector, and a second optical wedge is interposed between the green light source and first reflector such that a green light beam output from the green light source passes through the second optical wedge before it is incident on the first reflector, and a third optical wedge is interposed between the blue light source and second reflector such that a blue light beam output from the blue light source passes through the third optical wedge before it is incident on the second reflector.

The projection device may further comprise one or more actuators which are operable to adjust the optical component so that the optical component is configured to compensate for variation between the light sources, in the directions (e.g. angular directions) in which the red, green and blue light beams are output from the red, green and blue light sources respectively, so that each of the red, green and blue light beams are directed to the same point on the display screen (and/or mirror). For example, the projection device may further comprise one or more actuators which are operable to adjust the orientation of the reflectors. E.G piezoelectric actuators.

The one or more actuators are preferably configured such that then can adjust the orientation of the reflectors, in response to a correction signal generated by a sensor which is operable to detect if the red, green and blue light beams are being directed from the optical component to the same point on the display screen (and/or mirror).

Or, for example, the device further comprises one or more actuators which are operable to adjust the positioning of the optical wedge.

The one or more actuators are preferably configured such that they can adjust the positioning of the optical wedges, in response to a correction signal generated by a sensor which is operable to detect if the red, green and blue light beams are being directed from the optical component to the same point on the display screen (and/or mirror). Preferably the one or more actuators are configured to adjust the positioning of the optical wedges, according to the correction signal, so that the red, green and blue light beams are directed from the optical component to the same point on the display screen (and/or mirror).

The projection device may further comprise a sensor which is configured to detect if the red, green blue and light beams outputted from the optical component, are directed from the optical component to the same point on the display screen (and/or mirror), and to generate a correction signal if the light beams are not being directed from the optical component to the same point on the display screen (and/or mirror).

The sensor may be further configured to such that it can send the correction signal to an actuator which is operable to adjust the optical component in response to the correction signal, so that the red, green and blue light output from the optical component, are directed to the same point on the display screen (and/or mirror). For example, the sensor may be configured to send a correction signal to an actuator which is operable to adjust the orientation of the first, second and third reflectors; and the actuator may adjust the orientation of the first, second and third reflectors according to the correction signal so that the red, green and blue light beams output from the optical component are directed to the same point on the display screen (and/or mirror). For example the orientation of the first, second and third reflectors may adjusted by the actuator such that, according to the correction signal, the red, green and blue light beams are aligned so that they are directed to the same point on the display screen (and/or mirror). Or the sensor may be configured to send a correction signal to an actuator which is configured to adjust the positioning of the optical wedges, and the actuator may adjust the positioning of the first second and third optical wedges, according to the correction signal, so that the red, green and blue light beams are aligned when output from the optical component so that they are directed to the same point on the display screen (and/or mirror).

The projection device may further comprise a controller which is configured to receive the correction signal and to interpret the correction signal and provide a control signal which is in a form suitable for operating an actuator. In this case the sensor would not directly communicate with the actuators in the device; rather the sensor would communicate via, the controller, with the actuators.

The sensor may be arranged to receive light output from the optical component.

The projection device may further comprise a beam splitter which is arranged to receive light output from the optical component.

The sensor may be arranged to receive parasitic light emitted from the beam splitter and to use the parasitic light to determine if the red, green and blue light output from the optical component, are being directed to the same point on the display screen (and/or mirror).

The projection device may further comprise three sockets each configured to receive a light source. The socket maybe defined within a housing of the projection device. Each light source may be located within a socket. Preferably, there is further provided glue between an outer surface of each light source and walls which define the sockets, to secure each light source within a respective socket. Preferably, the glue is evenly distributed around the outer surface of each light source. The glue defines a layer. Preferably the layer has an equal thickness throughout the layer.

Preferably the sockets are fixed by means of a push fit fitting to the mechanical housing, to enable good thermal dissipation. The push-fit fitting is a fitting which is configured to enable the connection of two or more components simple by pushing the components together. Advantageously such a fitting does not require glue or other type of intermediate material. Indeed the push-fit may further use pressure and and/or heat in order to connect the one or more components; for example to fix a cylinder (e.g. an cylindrical light source) inside a tube (e.g. socket defined in the housing of a projection device).

BRIEF DESCRIPTION OF THE DRAWINGS

The invention will be better understood with the aid of the description of an embodiment given by way of example and illustrated by the figures, in which:

FIGS. 1a-d shows the steps involved in a method manufacturing a projecting device according to of the present invention to provide a projection device according to an embodiment of the present invention;

FIG. 2b illustrates a projection device according to an embodiment of the present invention;

FIG. 4 illustrates a projection device according to a further embodiment of the present invention;

FIG. 5 illustrates a projection device according to a further embodiment of the present invention;

FIGS. 6a-d shows the steps involved in a method of manufacturing a projecting device according to the present invention to provide a projection device according to a further embodiment of the present invention.

DETAILED DESCRIPTION OF POSSIBLE EMBODIMENTS OF THE INVENTION

Figure 1C:
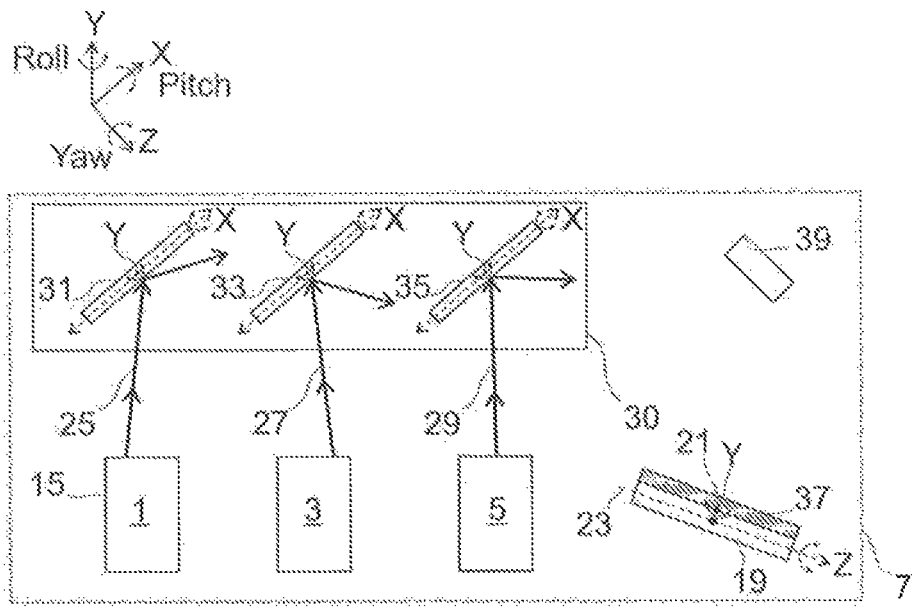

FIGS. 1a-d shows the steps involved in a method of manufacturing a projecting device according to one example of the present invention, to provide a projection device 20 according to an embodiment of the present invention.

A method comprises the steps of, providing a red light source 1, green light source 3 and blue light source 5 and arranging the light sources 1,3,5 within a housing 7 such that they are in parallel. The red light source 1, green light source 3 and blue light source 5 are operable to emit red, green and blue light beams 25,27,29 respectively. Even though the light sources 1,3,5 are in parallel, the light beams 25,27,29 are emitted in different directions due to variations in the mechanical assembly tolerance of each light source 1,3,5.

The red light source 1, green light source 3 and blue light source 5 are each fixed within a housing 7, so that the light sources 1,3,5 are immovable from their parallel positions. In this embodiment the light sources 1,3,5 are fixed using glue. Glue 13 is evenly distributed around an outer surface 15 of each light source 1,3,5. As can be best seen from FIG. 2, once the glue 13 has been applied to the outer surface of each light source 1,3,5, each light source is placed into a respective socket 8,9,11. Sockets 8,9,11 are in parallel so that the light sources 1,3,5 will be in parallel when placed within the sockets 8,9,11. The sockets 8,9,11 may be defined in the housing 7.

Figure 2A:
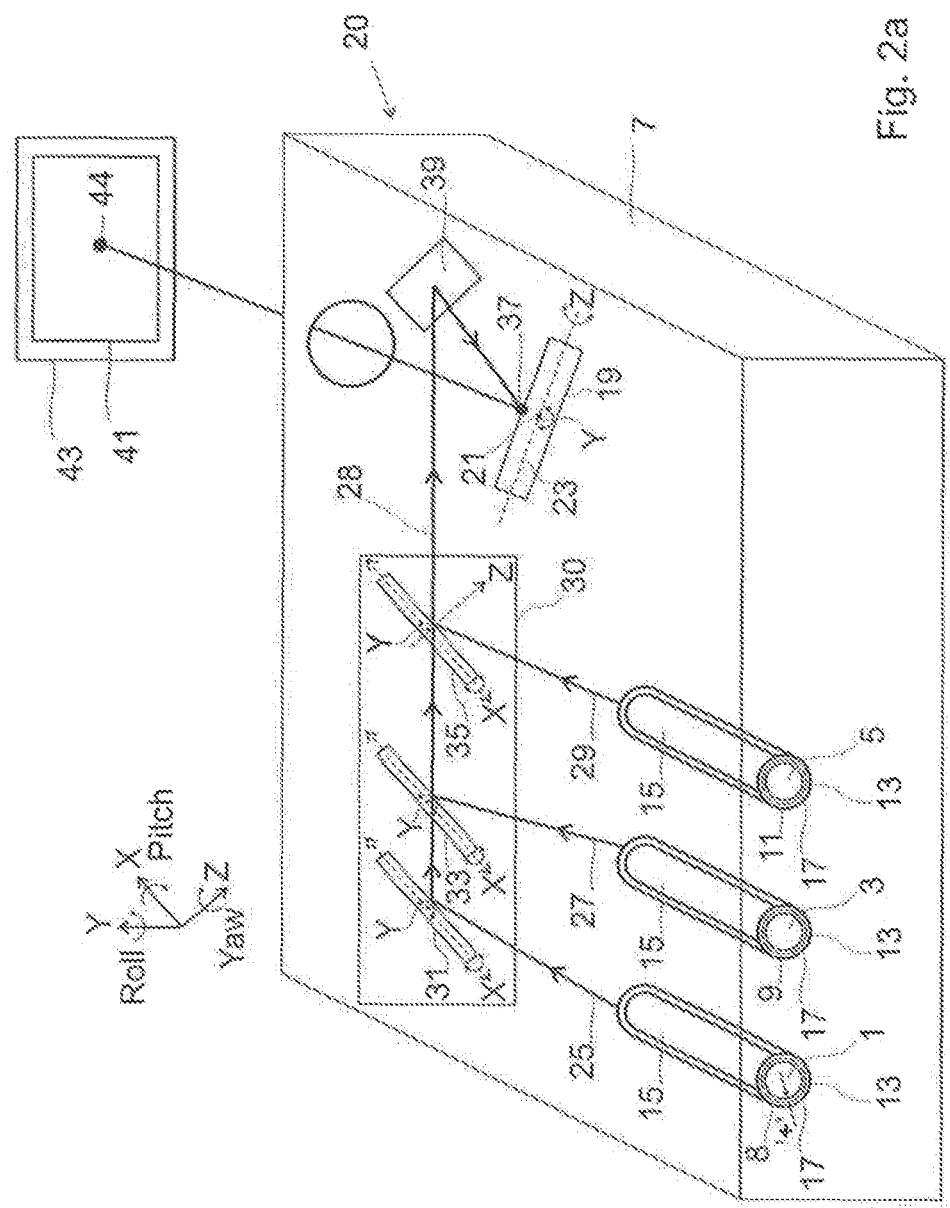
FIG. 2a provides a perspective view of the projection device according to an embodiment of the present invention which is made by the manufacturing process illustrated in FIG. 1.

As seen in FIG. 2a, the glue 13 will arrange between an outer surface 15 of each the light source 1,3,5 and walls 17 which define the sockets 8,9,11. When the glue 13 dries, polymerized and/or cures (case of UV glue) the light sources 1,3,5 are fixed within their respective sockets 8,9,11 to secure each light source 1,3,5 in a fixed position. Each light sources 1,3,5 is centred within its respective socket such that the glue 13 is evenly distributed around the outer surface 15 of each light source 1,3,5 so as to define a layer of glue which has an equal thickness 't' throughout.

Next, as shown in FIG. 1b, a mirror 19 which is configured to oscillate about two oscillation axes 21,23 (i.e. the y-axis known as the roll axis and the z-axis known as the yaw axis) such that it can oscillate in two dimensions to scan light it receives across a display screen (not shown) is provided in the housing 7. The mirror 19 is a 2-D mirror which can oscillate about two orthogonal oscillation axes to scan light in a zig-zag pattern across a display screen. Alternatively a pair of mirrors may be provided in the housing 7, each mirror of the pair being configured to oscillate about an oscillation axis and wherein the oscillation axis of one mirror in the pair is orthogonal to the oscillation axis of the other mirror in the pair so that one mirror of the pair can scan light along the horizontal and the other mirror can scan light along the vertical.

Next, as shown in FIG. 1c, an optical component 30, is arranged within the housing 7 to receive the red, green and blue light beams 25,27,29 outputted from the red, green and blue light sources 1,3,5 respectively. Optionally, an intermediate-deflector 39 is provided in the housing 7 which is arranged to receive light output from the optical component 30 and to deflect the light to the mirror 19. Alternatively, the mirror 19 may be arranged such that it receives directly light outputted from the optical component 30.

The optical component 30 comprises at least one reflector, whose angular orientation and lateral position (by translation) can be adjusted. In this particular example the optical component 30 comprises a first, second and third reflector 31,33,35. The optical component 30 is configured such that the angular orientation of each of the first, second and third reflector 31,33,35 can be adjusted independently of the other reflectors 31,33,35 so that each reflector 31,33,35 can be orientated to deflect light in a different direction to the other reflectors 31,33,35. Each of the first, second and third reflectors 31,33,35 can be independently moved along and/ or about an x-axis and y-axis (the x and y axes being orthogonal to one another) to allow adjustment of the angular and linear orientation of each reflector.

Even though the light sources 1,3,5 are arranged in parallel, due to variations in the mechanical assembly and/or optical properties of each light source 1,3,5 they will each emit their respective red, green and blue light beams 25,27, 29 in different directions. For example, in order to manufacture light emitting sources at high volumes and lower cost the assembling the light emitting source crystal fixation to its header is performed in a fast manner which lead to large uncertainty on the exact light emitting location, the uncertainty of the light emitting surface location lead to uncertainty of the light beam emitting angular direction and to uncertainty in central positioning of the laser chip according to the central axis of the package, which can lead to lateral displacement. Lateral displacement of the light sources 1,3,5 will induce shift of the beams from one to each other after the reflection on the reflectors 31,33,35.

Figure 1D:
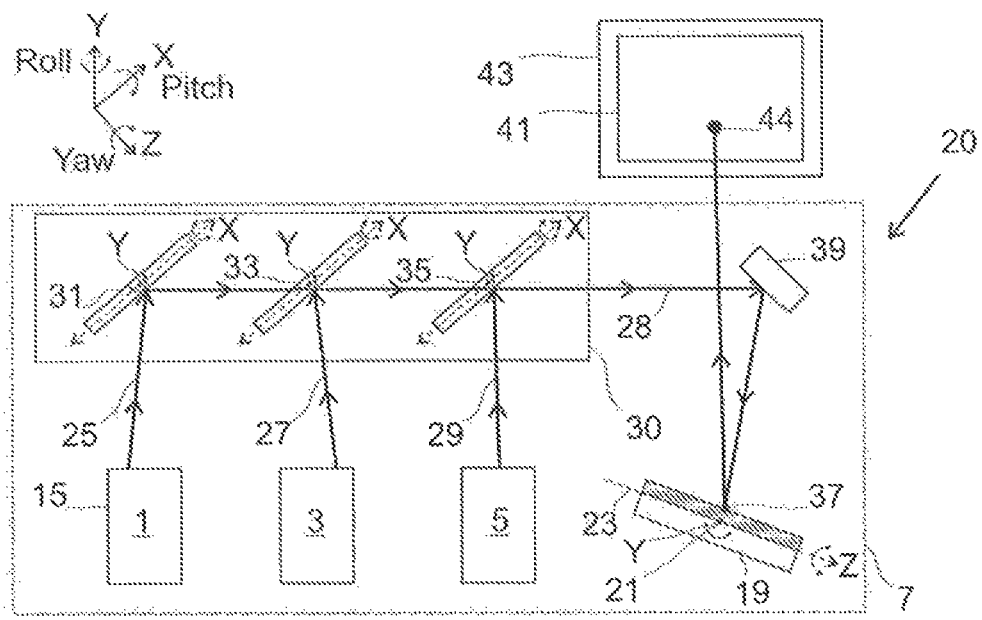

As illustrated in FIG. 1*d*, the optical component 30 is then adjusted such that the optical component 30 compensates for variation, between the light sources 1,3,5, in the direction in which they each output their red, green and blue light beams 25,27,29 respectively, so that each of the red, green and blue light beams 25,27,29 are directed to a single point 37 on the mirror 19

To adjust the optical component 30, the orientations of each of the first, second and third reflectors 31,33,35 of the optical component 30, are independently set such that each reflector 31,33,35 deflects a respective light beam 25,27,29 from a respective light source 1,3,5, to the same, single, point 37 on the mirror 19 and to the same, single, point 44 on a display screen 43. Preferably, the angular orientation only of each of the first, second and third reflectors 31,33,35 is adjusted by moving each of the first, second and third reflectors 31,33,35 along and/or about an x-axis and y-axis so that they each direct a respective light beam 25,27,29 to the same, single, point 37 on the mirror 19 and to the same, single, point 44 on a display screen 43.

Since the red, green and blue light beams 25,27,29 are emitted in different direction from their respective light sources 1,3,5, each of the red, green and blue light beams 25,27,29 will require a different amount of deflection in order to be directed to the same, single, point 37 on the mirror 19 and to the same, single, point 44 on the display screen 43. Thus, each reflector 31,33,35 may need to be arranged into a different orientation to the other reflectors 31,33,35. Providing reflectors 31,33,35 which can be independently adjusted enables each reflector 31,33,35 to be arranged into a different orientation.

Of course it will be understood that in the event that any of the light beams 25,27,29 are emitted in the same direction from their respective light sources 1,3,5, then each of these light beams will require the same amount of deflection in order to be directed to the same, single, point 37 on the mirror 19 and to the same, single, point 44 on the display screen 43; in this case at least two of the reflector 31,33,35 will be adjusted to have the same orientation.

In this particular embodiment the optical component 30 is further configured such that it can combine the red light beam, green light beam and blue light beam 25,27,29 to form a single beam 28 which is directed to the mirror 19.

In the present invention the optical component 30 is used to compensate for the variation in the directions in which the light beams 25,27,29 are output from the light sources 1,3,5, so that light beams 25,27,29 are directed to the same point 37 on the mirror 19 and to the same, single, point 44 on the display screen 43; this obviates the need for the position and orientation of the light sources 1,3,5 to be adjusted during manufacturing to compensate for variations in the direction in which red, green and blue light beams 25,27,29 are outputted from the red, green and blue light sources, 1,3,5 respectively. Accordingly, glue 13 which is used to fix the light sources 1,3,5 can remain evenly distributed around each light source 1,3,5. An even distribution of glue 13 will ensure that the light source 1,3,5 is less susceptible to becoming displaced over time and temperature.

FIG. 2*a* provides a perspective view of the projection device 20 according to an embodiment of the present invention which is made by the manufacturing process illustrated in FIG. 1. The projection device 20 has the same features as shown in the device 20 of FIG. 1*d* and like features are awarded the same reference numbers. The projection device 20 is shown in operation to project an image 41 onto a display screen 43.

FIG. 2*b* illustrates projection device 50 wherein the red green and blue light beams are directed to different points on the mirror 19 but are still directed to the same, single, point 44 on the display screen 43. The projection device 50 shown in FIG. 2*b* has many of the same features as the projection devices 20 shown in FIGS. 1*d* and 2*a* and like features are awarded the same reference numbers. The orientations of each of the first, second and third reflectors 31,33,35 of the optical component 30, are independently set such that each reflector 31,33,35 deflects a respective light beam 25,27,29 from a respective light source 1,3,5, to different positions on the mirror 19 to ensure that each of the light beams 25,27,29 are directed by the mirror 19 to the same, single point, 44 on a display screen 43. The angle at which a light beam 25,27,29 is incident on the mirror 19 will determine the angle at which the light beam 25,27,29 is reflected by the mirror 19; thus each light beam 25,27,29 is directed to an appropriate point on the mirror 19 whereby it has angle of incidence which is required to ensure that that light beam 25,27,29 is reflected by the mirror 19 to the same point 44 on the display screen 43. Thus, the differences in the directions in which each of the light sources 1,3,5 emit their respective light beams 25,27,29 can be compensated for by directing each light beam 25,27,29 to the appropriate point on the mirror 19.

In contrast to the embodiment shown in FIGS. 1*d* and 2*a*, the optical component 30 is not configured to combine the light beams 25,27,29, rather each of the light beams 25,27, 29 are directed by the optical component 30 to different points on the mirror 19. Thus the light beams 25,27,29 remain independent until they reach the display screen 43, and are emitted in different directions as they are output from the optical component 30. The optical component 30 is however arranged such that the light beams 25,27,29 converge as they travel towards the mirror 19. Furthermore, the projection device 50 does not comprise an intermediate-deflector and light beams 25,27,29 output from the optical component 30 are sent directly to the mirror 19 (however it will be understood that the projection device 50 could comprise an intermediate-deflector arranged similarly to the intermediate-deflectors shown in the previous embodiments shown in FIGS. 1*d* and 2*a*). The point on the mirror 19 which each light beam 25,27,29 is directed depends on the amount of deflection of the light beam 25,27,29 which is required to ensure that it is directed to the single point 44 on the display screen 43.

The embodiment shown in FIG. 2*b* would be useful in cases where the beams are required to overlay each other only at a predefined distance from the projection device. For example, in Head-Up-Display applications. Typically the predefined distance will be the distance to a display screen or a diffuser screen. Advantageously, this embodiment has a simplified assembly process and has lower required assembly tolerances.

Figure 3:
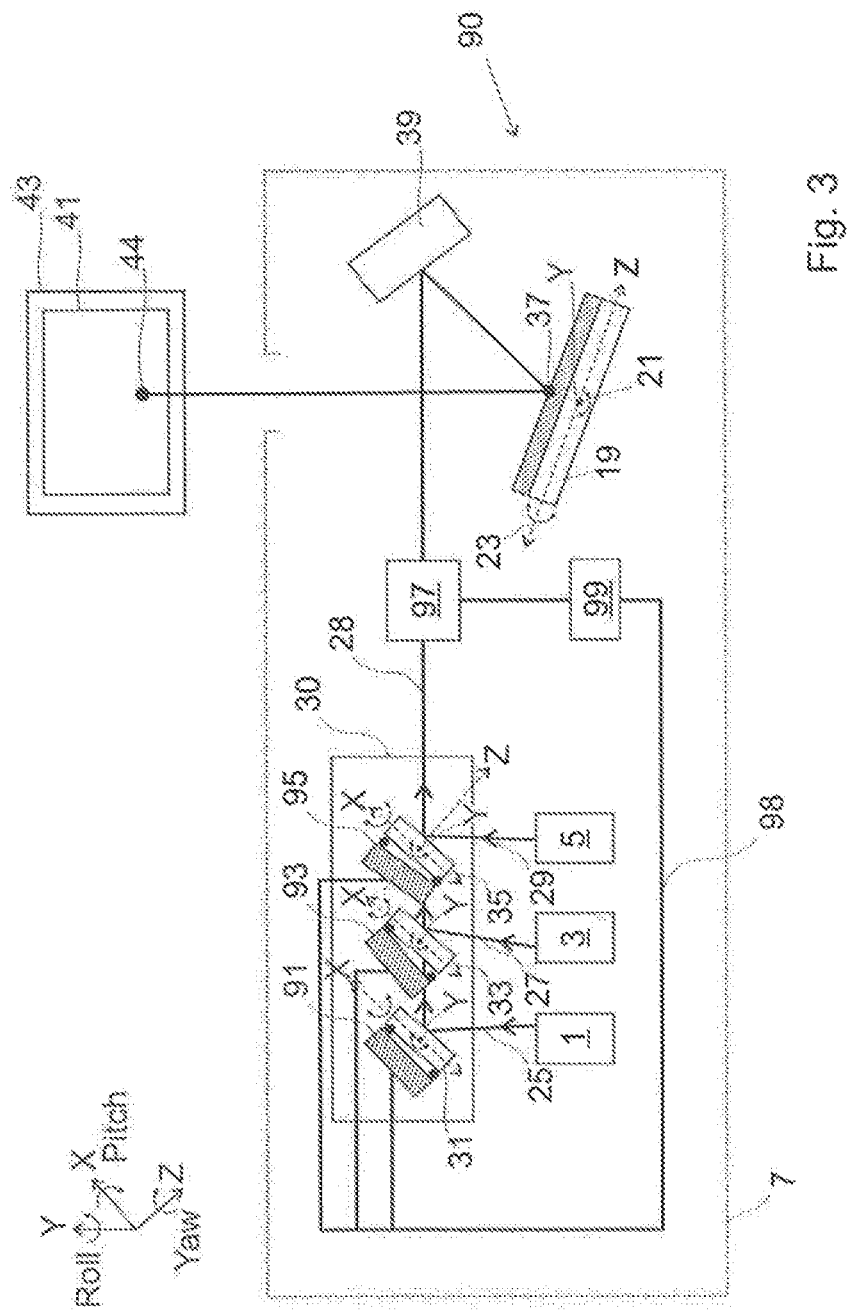
FIG. 3 illustrates projection device according to a further embodiment of the present invention.

FIG. 3 illustrates projection device 90 according to a further embodiment of the present invention. The projection device 90 has many of the same features as the projection device 20 shown in FIGS. 2*a* and 1*d* and like features are awarded the same reference numerals.

The projection device 90 comprises a first, second and third actuator 91,93,95, each of which co-operates with a respective reflector 31,33,35 such that each actuator 91,93, 95 can adjust the orientation of a respective reflector 31,33, 35. The actuator 91,93,95 enable the adjustment of the optical component 30 such that the optical component 30 can direct each of the red, green and blue light beams 25,27,29 to the same, single, point 37 on the mirror 19 and the same, single, point 44 on the display screen 43, to be carried out automatically. The actuators 91,93,95 take any suitable form, for example the actuators 91,93,95 maybe piezoelectric, electrostatic, electro-magnetic or thermal actuators.

The projection device 90 further comprises a sensor 97 which is configured to detect if the red, green blue and light beams 25,27,29 outputted from the optical component 30, are being directed to the same, single, point 37 on the mirror 19 and the same single point 44 on the display screen 43, and to generate a correction signal if the light beams 25,27,29 are not being directed from the optical component to the same, single, point 37 on the mirror 19 and the same single point 44 on the display screen 43. In this particular embodiment the sensor 97 is arranged to receive light directly from the optical component 30. Since the optical component 30 combines the red, green and blue light beams 25,27,29 to provide a single light beam 28, the sensor 97 receives the single light beam 28. The sensor 97 may for example be configured to detect the direction in which the light beams 25,27,29 are propagating so as to determine if they are each being directed to the same, single, point 37 on the mirror 19 and the same single point 44 on the display screen 43.

The sensor 97 is further configured to such that it can send the correction signal, along communication line 98, to the actuators 91,93,95 so that the actuators correct the orientation of the first, second and third reflectors 31, 33, 35 so that the red, green and blue light beams 25,27,29 are directed to the same, single, point 44 on the display screen 43. Preferably the red, green and blue light beams 25,27,29 directed to the same, single, point 37 on the mirror 19. For example, the actuators 91,93,95 may adjust the orientation of the reflectors 31,33,35 according to the correction signal generated by the sensor. The sensing by the sensor 97 and the adjustment of the optical component 30 by the actuators 91,93,95 may be performed while the projection device 90 is in operation thus enabling the projection device 90 to be adjusted during use. Additionally, or alternatively, the sensing by the sensor 97 and the adjustment of the optical component 30 by the actuators 91,93,95 may be performed during the manufacturing of the projection device 90 thus automating the step illustrated in FIG. 1d. It should be noted that the sensor 97 may alternatively be located after the intermediate-deflector 39; in this case the intermediate-deflector 39 will be configured to reflecting a major part of the light it receives but to allow enough light to pass through the intermediate-deflector 39 so that the sensor can sense the light and then detect the spot position.

The device may further comprise a controller 99 which is configured to receive a correction signal generated by the sensor 97 and to interpret the correction signal and provide a control signal which is in a form usable by an actuator 91,93,95. In this case the sensor 97 would not directly communicate with the actuators 91,93,95; rather the sensor 97 would communicate via, the controller 99, with the actuators 91,93,95.

FIG. 4 illustrates a projection device 100 according to a further embodiment of the present invention. The projection device 100 has many of the same features as the projection device 90 shown in FIG. 3 and like features are awarded the same reference numbers.

The projection device 100 further comprise a beam splitter 101 which is arranged to receive the single beam 28 which is output from the optical component 30.

The sensor 97 is arranged to receive parasitic/transmitted light 103 which is emitted from the beam splitter 101 and to use the parasitic light 103 to determine if the red, green blue and light beams 25,27,29 are being directed to the same, single, point 37 on the mirror 19 and same, single point 44 on the display screen 43.

FIG. 5 illustrates a projection device 120 according to variation of the embodiment shown in FIGS. 1d and 2. The projection device 120 has many of the same features of the projection device 20 shown in FIGS. 1d and 2a and like features are awarded the same reference numbers.

In the projection device 120 the optical component 30 comprises a first and second reflector 31,33 only, the orientations of which can be adjust independently. This embodiment requires that the red light source 1 be arranged such that its output red light beam is directed to the single point 37 on the mirror 19 and same single point 44 on the display screen 43 without requiring deflection by the optical component 30. The first and second reflectors 31,33 are use to compensate for the variations in the directions in which the respective beams are output from the green and blue light sources 3,5.

FIGS. 6a-d shows the steps involved in manufacturing a projecting device according to a further method of the present invention to provide a projection device 60 according to a further embodiment of the present invention.

Figure 6C:
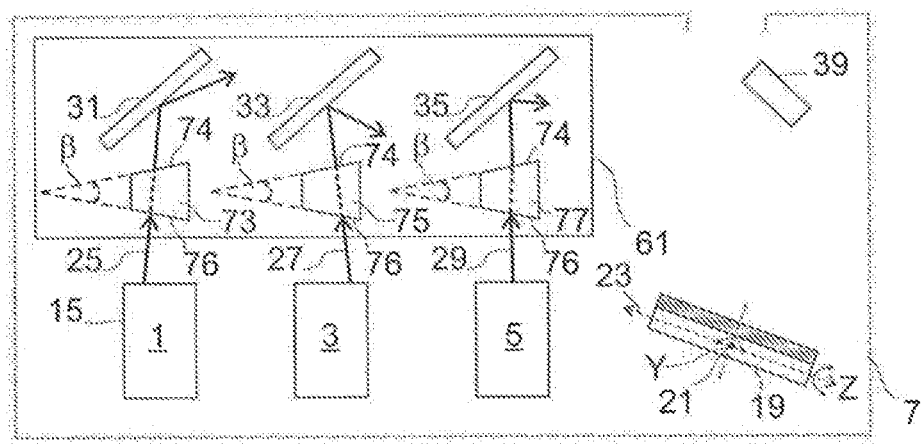

The steps shown FIGS. 6a-c are the same as those steps shown in FIGS. 1a-c, and the projection device 60 has many of the same features of the projection device shown in FIGS. 1d and 2, and like features are awarded the same reference numbers.

In the embodiment illustrated in FIGS. 6a-d the optical component 61 comprises a first, second and third reflector 63,65,67, wherein each of the first, second and third reflectors 63,65,67 are fixed in parallel. The optical component 61 further comprises a first, second and third optical wedge 73,75,77 each of which is interposed between a respective light source 1,3,5 and reflector 63,65,67. The first optical wedge 73 is interposed between the red light source 1 and first reflector 63 such that a red light beam 25 output from the red light source 1 passes through the first optical wedge 73 before it is incident on the first reflector 63. The second optical wedge 75 is interposed between the green light source 3 and second reflector 65 such that a green light beam 27 output from the green light source 3 passes through the second optical wedge 75 before it is incident on the second reflector 65. The third optical wedge 77 is interposed between the blue light source 5 and third reflector 67 such that a blue light beam 29 output from the blue light source 5 passes through the third optical wedge 77 before it is incident on the third reflector 67.

Each of the optical wedges 73,75,77 are trapezium shaped. Each of the optical wedges 73,75,77 is a wedge prism; each optical wedges 73,75,77 comprises an input and output surface 74,76 respectively through which light is incident and emitted respectively. The input and output surfaces 74, 76 are configured such that a shallow angle β exists between the surfaces 74,76. Each of the optical wedges 73,75,77 can deflect light; the angle at which an optical wedge 73,75,77 deflect a light beam depends on the angle between the front and rear side of the optical wedge 73,75,77 through which the light beam travels. It should be noted that that depending on initial angular error (i.e. the angle between the light beam emitted by the light source and the axis defined by the light source) of a light source, an optical wedge may be chosen from a plurality of different wedges with different angles (ideally the closest to the bean angular error), so as to minimize the amount of adjustment, movement and displacement distance of the optical wedges, required to make the final working projection device, thus minimizing the assembly time and cost. A set of optical wedges may be provided comprising a plurality of optical wedge which each have different angles between the front and rear side of the optical wedge.

The angle between the front and rear side of the optical wedge 73,75,77 which define the optical wedges 73,75,77 deflection angle depend on the red, green and blue light beams 25,27,29 emission angular direction. The angle between the front and rear side of the optical wedge 73,75,77 may be different for each optical wedge 73,75,77.

The optical component 61 is configured such that the positioning of each optical wedge 73,75,77 can be adjusted independently of the other optical wedges 73,75,77.

As with the method described in FIGS. 1a-d the optical component 61 is then adjusted such that the optical component 61 compensates for variation, between the light sources 1,3,5, in the angular direction in which they each output their red, green and blue light beams 25,27,29 respectively, so that each of the red, green and blue light beams 25,27,29 are directed to the same, single, point 44 on the display screen 43 by the mirror 19. Preferably the red, green and blue light beams 25,27,29 are directed to a single point 37 on the mirror 19.

Figure 6D:
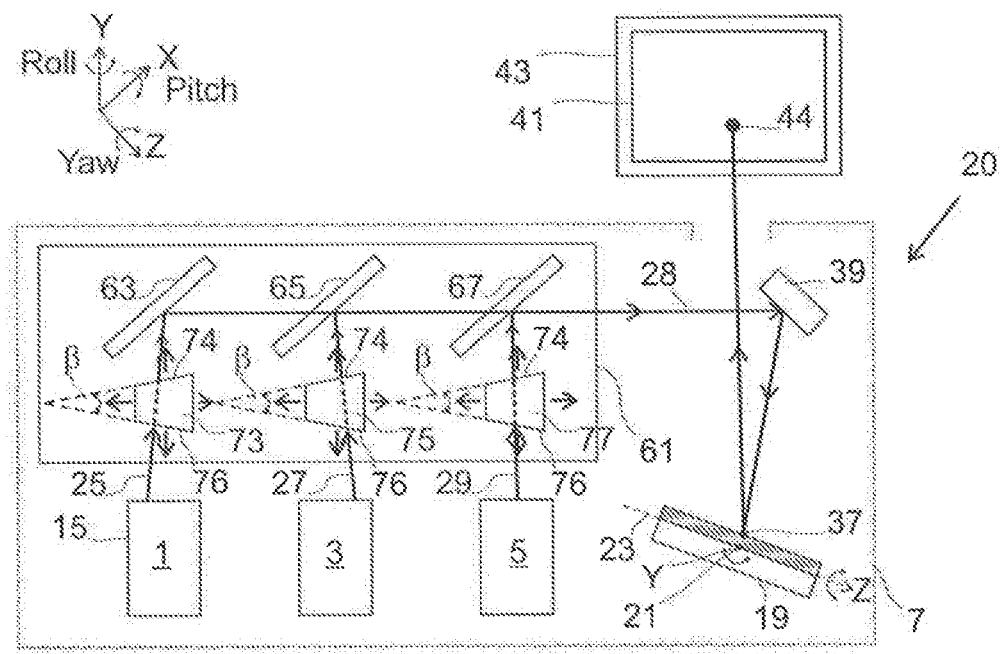

To adjust the optical component 61 such that the optical component 61 can direct each of the red, green and blue light beams 25,27,29 to the same single point 37 on the mirror 19 and on the display screen 43, the positioning of each of the optical wedges 73,75,77 of the optical component 61, relative to a respective light sources 1,3,5, is adjusted such that the red, green and blue light beams 25,27,29 are incident on the first, second and third reflectors 63,65,67 respectively, at angles which ensure that red, green and blue light beams 25,27,29 are deflected by the reflectors 63,65,67 to the same, single, point 37 on the mirror 19 and to the same, single, point 44 on the display screen 43. By moving each of the optical wedges 73,75,77 laterally with respect to a light sources 1,3,5 and/or moving the optical wedges 73,75,77 axially and/or moving the optical wedges 73,75,77 angularly and/or selecting optical wedges with different angle between the front and rear face of the optical wedges 73,75,77 with respect to the light sources 1,3,5 the angle at which the red, green and blue light beams 25,27,29 are deflected as be adjusted (as shown in FIG. 6d).

The deflection of the light beams 25,27,29 by the optical wedges 73,75,77 will compensate for the variation, between the light sources 1,3,5, in the direction in which they each output their red, green and blue light beams 25,27,29 respectively.

Preferably the positions of the first, second and third reflectors 63,65,67 are fixed. The first, second and third reflectors 63,65,67 are preferably fixed in parallel. The first, second and third reflectors 63,65,67 are configured to combine the red, green and blue light beams 25,27,29 to form a single light beam 28. Most preferably the position of each of the optical wedges 73,75,77 is adjusted to ensure that red, green and blue light beams 25,27,29 are parallel when output from the optical wedges 73,75,77; this will ensure that the red, green and blue light beams 25,27,29 are in parallel when incident on the reflectors 63,65,67. Since each of the red, green and blue light beams 25,27,29 are in parallel when incident on the reflectors 63,65,67, each of the first, second and third reflectors 63,65,67 may be fixed (preferably in parallel). Thus, the method may further comprise fixing the position of a first reflector 63 relative to the red light source 1, fixing the position of a second reflector 65 relative to the green light source 5, and fixing the position of a third reflector 67 relative to the blue light source 7. Preferably first, second and third reflectors 63,65,67 are fixed such that they are in parallel. The first, second and third reflectors 63,65,67 may be fixed such that they are immovable from their parallel arrangement Preferably the projection device 60 will be configured such that each of the red, green and blue light beams 25,27,29 will be incident on the first, second and third reflectors 63,65,67 respectively at an angle of 45° to a surface of the respective reflector 63,65,67.

Similar to the projection device 90 shown in FIG. 4, it will be understood that actuators (not shown), may be arranged to co-operate with a respective optical wedge 73,75,77, such that each actuator can adjust the positioning of a respective optical wedge 73,75,77. The actuators will enable the step of adjusting the optical component 61 such that the optical component 61 can direct each of the red, green and blue light beams 25,27,29 to the same, single, point 37 on the mirror 19 and to the same, single, point 44 on the display screen 43, to be carried out automatically.

Similar to the projection device 90 shown in FIG. 4 the actuators will preferably configured such that they can adjust the positioning of the optical wedges 73,75,77, in response to a correction signal generated by a sensor 97 which is operable to detect if the red, green and blue light beams 25,27,29 are being directed from the optical component 61 to the same, single, point 37 on the mirror 19 and to the same, single, point 44 on the display screen 43. Preferably, the actuators would be configured to adjust the positioning of the optical wedges 73,75,77, according to the correction signal, so that the red, green and blue light beams 25,27,29 are directed from the optical component 61 to the same, single, point 37 on the mirror 19 and to the same, single, point 44 on the display screen 43. The correction signal will be generated by the sensor 97, if the sensor 97 detects that the red, green and blue light beams 25,27,29 are not being directed to the same point on the mirror 19 and to the same, single, point 44 on the display screen 43.

As with the embodiment shown in FIG. 2b, it will be understood that the red, green and blue light beams 25,27,29 do not need to be directed to the same, single, point 37 on the mirror 19 to be directed to the same, single, point 44 on the display screen 43. For example, if the light beams are output in different directions from the light sources, the optical component 61 may be configured to direct the light beams to different points on the mirror 19, so that each of the light beam has an angle of incidence with the mirror which is required to ensure that the mirror 19 reflects each of the light beams to the same, single, point 44 on the display screen 43.

As a variation on the embodiment shown in FIG. 6d it will be understood that the optical component 61 could comprise a first and second reflector 63, 65 only, wherein each of the first and second reflectors 63, 65 are arranged in parallel and fixed relative to one another. The first and second and third optical wedge 73,75,77 may each be interposed between a respective light source 1,3,5 and a reflector 63, 65. In this embodiment the first optical wedge 73 is interposed between the red light source 1 and first reflector 63 such that a red light beam 25 output from the red light source 1 passes through the first optical wedge 73 before it is incident on the first reflector 63, and wherein a second optical wedge 75 is interposed between the green light source 3 and first reflector 63 such that a green light beam 27 output from the green light source 3 passes through the second optical wedge 75 before it is incident on the first reflector 63, and wherein a third optical wedge 77 is interposed between the blue light source 29 and second reflector 65 such that a blue light beam 29 output from the blue light source 5 passes through the third optical wedge 77 before it is incident on the second reflector 65.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

What is claimed is:

1. An apparatus for a head-up-display, comprising:
   a light source operable to output a red light beam, a green light beam, and a blue light beam; and
   an optical component to direct the red, green and blue light beams to a heads-up-display screen, the optical component to compensate for variation between directions in which the red, green and blue light beams are output from the light source to direct the light beams to a point on the heads-up-display screen.

2. The apparatus for the heads-up-display of claim 1, the light source comprising:
   a first light source to output the red light beam;
   a second light source to output the green light beam; and
   a third light source to output the blue light beam.

3. The apparatus for the heads-up-display of claim 2, the first, second, and third light sources immovably fixed in respective positions of the apparatus.

4. The apparatus for the heads-up-display of claim 2, the optical component comprising:
   a first reflector;
   a second reflector independently adjustable from the first reflector; and
   a third reflector independently adjustable from the first and second reflectors.

5. The apparatus for the heads-up-display of claim 4, the optical component comprising:
   a first, a second and a third reflector, each of the first, second and third reflectors arranged in parallel relative to one another; and
   a first, a second and a third optical wedge, each of the first, second, and third optical wedges interposed between a respective light source and reflector, the positioning of each optical wedge independently adjustable from the other optical wedges.

6. The apparatus for the heads-up-display of claim 1, comprising one or more actuators to adjust the optical component to compensate for variation between the directions in which the red, green and blue light beams are output from the light source.

7. The apparatus for the heads-up-display of claim 1, comprising a sensor, the sensor to:
   detect if the red, green and blue light beams are directed from the optical component to the same point on the heads-up-display screen; and
   generate a correction signal based on detecting the light beams are not directed from the optical component to the point on the heads-up-display screen.

8. The apparatus for the heads-up-display of claim 1, comprising a mirror to receive the red, green and blue light beams from the light source and to reflect the red, green, and blue light beams to the point on the heads-up-display screen.

9. The apparatus for the heads-up-display of claim 8, the mirror to oscillate to scan the reflected red, green, and blue light beams across the heads-up-display screen.

10. A method to project light for a heads-up-display, comprising:
    emitting, from a light source, a red light beam, a green light beam, and a blue light beam;
    receiving the red light beam, the green light beam, and the blue light beam at an optical component;
    compensating, at the optical component, for variation between directions in which the red, green and blue light beams are emitted from the light source; and
    directing, from the optical component, the compensated red, green, and blue light beams to a point on a heads-up-display screen.

11. The method to project light for the heads-up-display of claim 10, comprising:
    emitting the red light beam from a first light source;
    emitting the green light beam from a second light source; and
    emitting the blue light beam from a third light source.

12. The method to project light for the heads-up-display of claim 11, the first, second, and third light sources immovably fixed in positions relative to each other.

13. The method to project light for the heads-up-display of claim 11, comprising:
    compensating, at the optical component, for variation between the directions in which the red, green and blue light beams are emitted from the light source via a first reflector, a second reflector independently adjustable from the first reflector, and a third reflector independently adjustable from the first and second reflectors.

14. The method to project light for the heads-up-display of claim 13, comprising adjusting, via one or more actuators, at least one of the first reflector, the second reflector, or the third reflector, to compensate for variation between the directions in which the red, green and blue light beams are output from the light source.

15. The method to project light for the heads-up-display of claim 11, the optical component comprising:
    a first, a second and a third reflector, each of the first, second and third reflectors arranged in parallel relative to one another; and
    a first, a second and a third optical wedge, each of the first, second, and third optical wedges interposed between a respective light source and reflector, the positioning of each optical wedge independently adjustable from the other optical wedges.

16. The method to project light for the heads-up-display of claim 10, comprising:
    determining whether the red, green and blue light beams are directed from the optical component to the point on the heads-up-display screen; and
    generating a correction signal based on a determination that the light beams are not directed from the optical component to the point on the heads-up-display screen.

17. The method to project light for the heads-up-display of claim 10, comprising:
    receiving, at a mirror, the compensated red, green, and blue light beams; and
    reflecting the compensated red, green, and blue light beams to the point on the heads-up-display screen.

18. The method to project light for the heads-up-display of claim 17, comprising:
    oscillate the mirror to scan the reflected compensated red, green, and blue light beams across the heads-up-display screen.

19. An apparatus for a head-up-display, comprising:
a light source operable to output a first light beam, a second light beam, and a third light beam, each of the first, second, and third light beams comprising a different wavelength from the other; and
an optical component comprising a first reflector, a second reflector, and a third reflector to receive the first, second, and third light beams respectively, the first, second, and third reflectors moveable in a first direction to compensate for variations between the directions in which the first, second, and third light beams are output from the light source and to direct the first, second, and third light beams to a point on a heads-up-display screen.

20. The apparatus for the heads-up-display of claim 19, the light source comprising:
a first light source to output the first light beam;
a second light source to output the second light beam; and
a third light source to output the third light beam.

21. The apparatus for the heads-up-display of claim 19, the optical component comprising:
the second reflector independently adjustable from the first reflector; and
the third reflector independently adjustable from the first and the second reflectors.

22. The apparatus for the heads-up-display of claim 19, the optical component comprising:
each of the first, the second, and the third reflectors arranged in parallel relative to one another; and
a first, a second and a third optical wedge, each of the first, second, and third optical wedges interposed between a respective light source and reflector, the positioning of each optical wedge independently adjustable from the other optical wedges.

23. The apparatus for the heads-up-display of claim 19, comprising one or more actuators to adjust the optical component to compensate for variation between the directions in which the first, second, and third light beams are output from the light source.

24. The apparatus for the heads-up-display of claim 19, comprising a mirror to receive the first, second and third light beams from the light source and to reflect the first, second, and third light beams to the point on the heads-up-display screen.

25. The apparatus for the heads-up-display of claim 24, the mirror to oscillate to scan the reflected first, second, and third light beams across the heads-up-display screen.

* * * * *